US010680255B2

(12) United States Patent
Poirot-Crouvezier

(10) Patent No.: US 10,680,255 B2
(45) Date of Patent: *Jun. 9, 2020

(54) FLOW-GUIDING PLATE FOR A FUEL CELL

(71) Applicant: COMMISSARIAT A L'ENERGIE ATOMIQUE ET AUX ENERGIES ALTERNATIVES, Paris (FR)

(72) Inventor: Jean-Philippe Poirot-Crouvezier, Saint Georges De Commiers (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 0 days.

This patent is subject to a terminal disclaimer.

(21) Appl. No.: 16/206,529

(22) Filed: Nov. 30, 2018

(65) Prior Publication Data
US 2019/0097246 A1 Mar. 28, 2019

Related U.S. Application Data

(63) Continuation of application No. 15/110,127, filed as application No. PCT/FR2015/050013 on Jan. 6, 2015, now Pat. No. 10,170,774.

(30) Foreign Application Priority Data
Jan. 7, 2014 (FR) ...................................... 14 50065

(51) Int. Cl.
H01M 8/0265 (2016.01)
H01M 8/1004 (2016.01)
(Continued)

(52) U.S. Cl.
CPC ....... *H01M 8/0265* (2013.01); *H01M 8/0206* (2013.01); *H01M 8/0254* (2013.01); *H01M 8/1004* (2013.01)

(58) Field of Classification Search
None
See application file for complete search history.

(56) References Cited

U.S. PATENT DOCUMENTS

2002/0081477 A1 6/2002 McLean et al.
2005/0064263 A1 3/2005 Goebel et al.
(Continued)

FOREIGN PATENT DOCUMENTS

WO 2009/067617 A1 5/2009

OTHER PUBLICATIONS

Chibe et al. (JP, 2005-032591) (a raw machine translation) (Abstract, Detailed Description & Drawings) (dated Mar. 2, 2005) (Year: 2005).*

(Continued)

Primary Examiner — Carmen V Lyles-Irving
(74) Attorney, Agent, or Firm — Oblon, McClelland, Maier & Neustadt, L.L.P.

(57) ABSTRACT

A flow-guiding plate for a fuel cell, including a conductive sheet including a relief: defining alternating flow channels on first and second faces, two successive channels on the first face being separated by walls; defining first and second access holes at ends of each of the flow channels on the second face and of a first group of flow channels on the first face; defining a flow restriction in each flow channel of a second group of flow channels on the first face, the cross-section of the flow restrictions being smaller than the cross-section of the access holes to the flow channels of the first group, the first face including alternating flow channels of the first group and alternating flow channels of the second group.

20 Claims, 6 Drawing Sheets

(51) Int. Cl.
*H01M 8/0206* (2016.01)
*H01M 8/0254* (2016.01)

(56) References Cited

U.S. PATENT DOCUMENTS

| | | |
|---|---|---|
| 2008/0311459 A1 | 12/2008 | Goebel et al. |
| 2009/0169964 A1 | 7/2009 | Ikeda |
| 2011/0269055 A1 | 11/2011 | Perry |
| 2011/0300465 A1 | 12/2011 | Ohta et al. |
| 2012/0301806 A1* | 11/2012 | Okabe ............... H01M 8/242 |
| | | 429/437 |
| 2016/0336603 A1 | 11/2016 | Poirot-Crouvezier |
| 2016/0336604 A1* | 11/2016 | Poirot-Crouvezier ................. |
| | | H01M 8/1004 |

OTHER PUBLICATIONS

International Search Report dated Apr. 14, 2015 in PCT/FR2015/050013 filed on Jan. 6, 2015.
Chiba et al. (JP 2005-032591) (a raw machine translation) (Abstract, Detailed Description & Drawings) (dated Feb. 3, 2005).

* cited by examiner

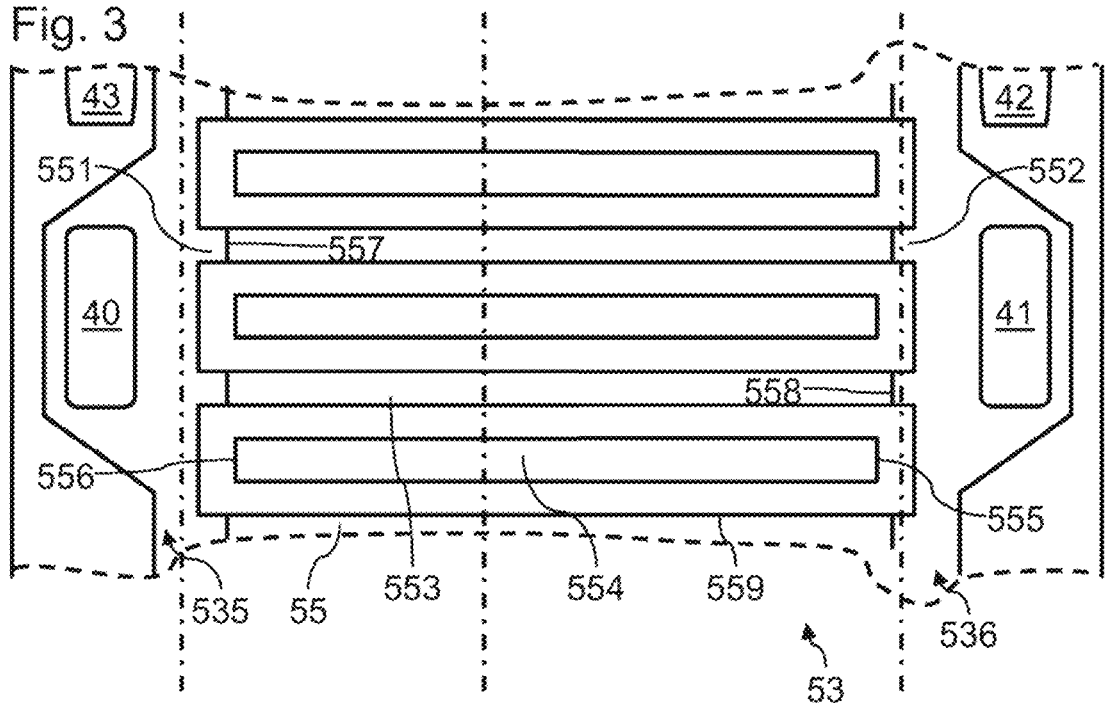
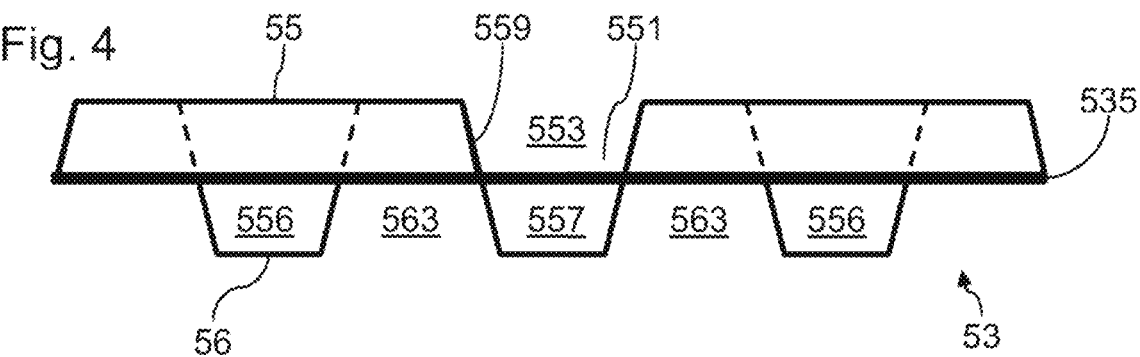
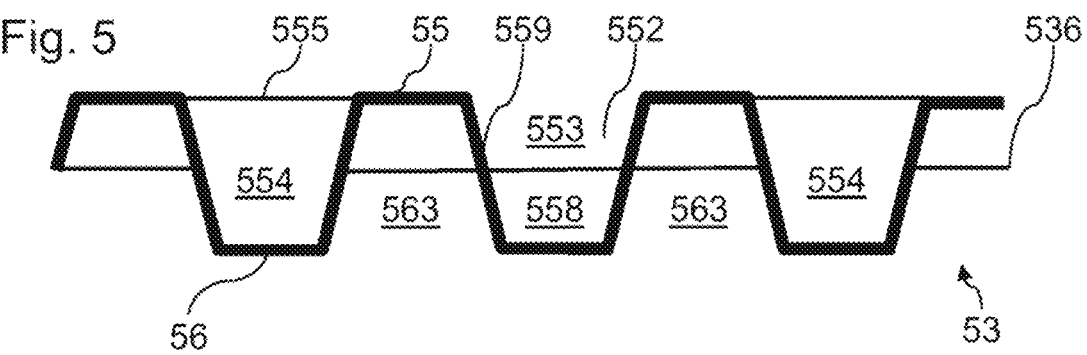

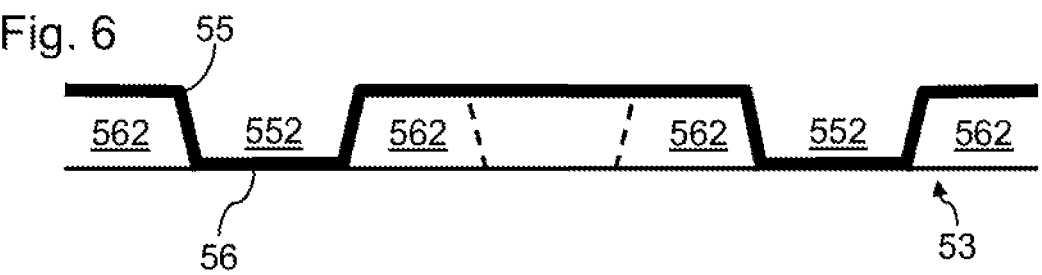
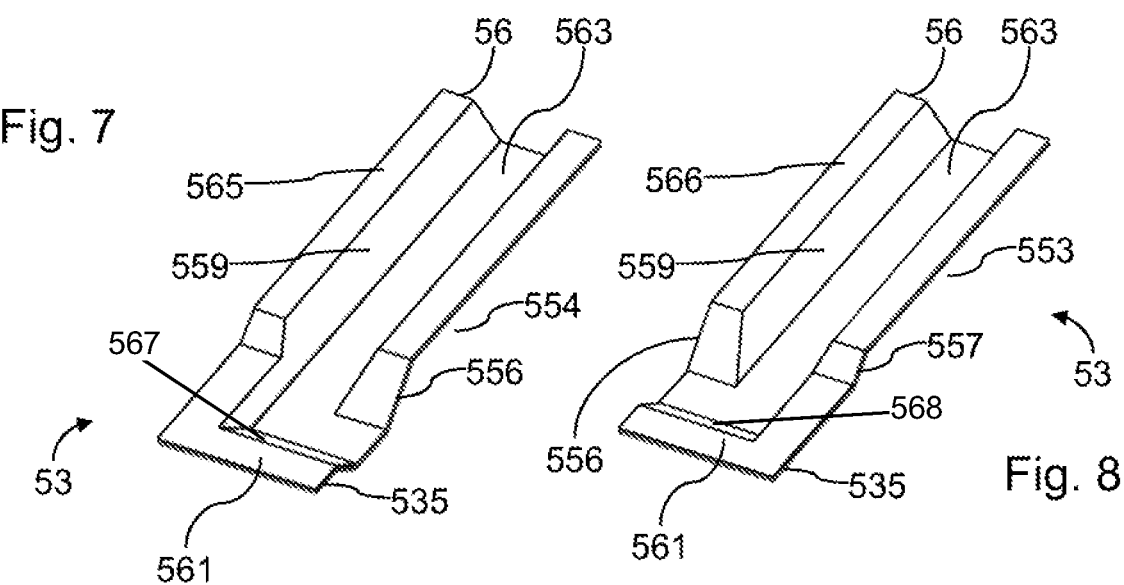
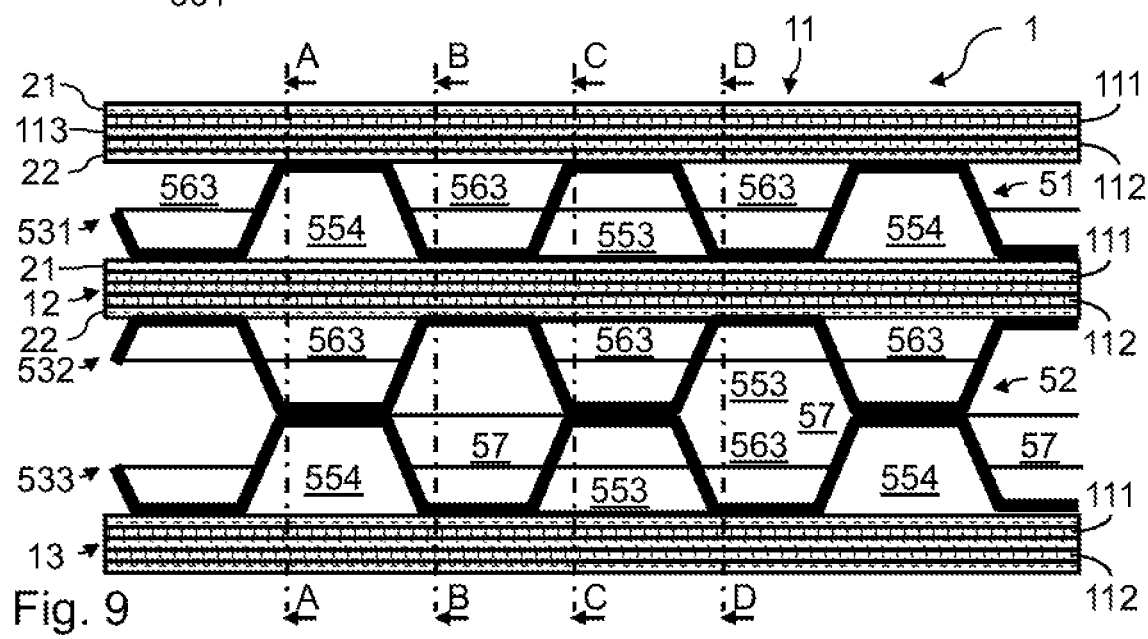

C-C

D-D

FLOW-GUIDING PLATE FOR A FUEL CELL

CROSS-REFERENCE TO RELATED APPLICATIONS

This application is a continuation of U.S. application Ser. No. 15/110,127, filed Jul. 7, 2016, which claims priority from International Application No. PCT/FR2015/050013, filed Jan. 6, 2015, which is based upon and claims the benefit of priority from French Patent Application 1450065, filed Jan. 1, 2017, the entire contents of each of which are incorporated herein by reference.

BRIEF SUMMARY

The invention relates to fuel cells and in particular to fuel cells comprising an alternation of proton exchange membranes and bipolar plates.

Fuel cells are envisaged as electrical supply systems for motor vehicles produced on a large scale in the future, and also for a large number of applications. A fuel cell is an electrochemical device which converts chemical energy directly into electrical energy. A fuel such as molecular hydrogen or methanol is used as fuel for the fuel cell.

In the case of molecular hydrogen, the latter is oxidized and ionized on an electrode of the fuel cell and an oxidant or combustion agent is reduced on another electrode of the fuel cell. The chemical reaction produces water at the cathode, oxygen being reduced and reacting with the protons. The great advantage of the fuel cell is that it avoids discharges of atmospheric polluting compounds on the site of electricity generation.

Proton exchange membrane fuel cells, known as PEM fuel cells, operate at low temperature and exhibit particularly advantageous compactness properties. Each cell comprises an electrolytic membrane which allows only the passage of protons and not the passage of electrons. The membrane comprises an anode on a first face and a cathode on a second face, in order to form a membrane electrode assembly, known as an MEA.

At the anode, the molecular hydrogen is ionized to produce protons which pass through the membrane. The electrons produced by this reaction migrate to a flow plate and then pass through an electric circuit external to the cell in order to form an electric current. At the cathode, oxygen is reduced and reacts with the protons to form water.

The fuel cell can comprise several plates, known as bipolar plates, for example made of metal, stacked on one another. The membrane is positioned between two bipolar plates. The bipolar plates can comprise flow channels and orifices for guiding the reactants and the products toward/from the membrane, for guiding cooling liquid and for separating different compartments. The bipolar plates are also electrically conducting in order to form collectors of the electrons generated at the anode. The bipolar plates also have a mechanical role of transmitting the strains of clamping of the stack necessary for the quality of the electrical contact. Gas diffusion layers are interposed between the electrodes and the bipolar plates and are in contact with the bipolar plates.

Electron conduction is carried out through the bipolar plates, ion conduction being obtained through the membrane.

The bipolar plates continuously supply the reactive surfaces of the electrodes with reactants, as they are consumed. The distribution of the reactants at the electrodes has to be as homogeneous as possible over the whole of their surface.

The bipolar plates comprise networks of flow channels which provide for the distribution of the reactants. A network of flow channels is dedicated to the anode fluid and a network of flow channels is dedicated to the cathode fluid. The networks of anode and cathode flow channels are never in communication inside the fuel cell, in order to prevent direct combustion of the fuel and the oxidant. The reaction products and the unreactive entities are discharged by entrainment by the flow as far as the outlet of the networks of distribution channels. In the majority of the architectures encountered, the bipolar plates comprise flow channels traversed by cooling liquid, making possible the discharge of the heat produced.

Three forms of circulation of the reactants in the flow channels are mainly distinguished:
  serpentine channels: one or more channels run through the entire active surface in several to-and-from paths.
  parallel channels: a bundle of parallel and traversing channels runs right through the active surface,
  interdigital channels: a bundle of parallel and blocked channels runs right through the active surface. Each channel is blocked, either on the side of the fluid inlet or on the side of the fluid outlet. The fluid entering a channel is then forced to pass locally through the gas diffusion layer in order to join an adjacent channel and subsequently reach the fluid outlet of this adjacent channel.

The flow channels can be straight or slightly wavy.

The materials most commonly used for the bipolar plates are carbon-polymer composite and embossed metal.

The embossed metal proves to be a solution which favors the lightening and the compactness of the fuel cells. The bipolar plates then use thin metal sheets, for example made of stainless steel. The flow channels are obtained by embossing. Most frequently, use is made of a first flow plate in the form of a first embossed sheet defining the anode flow channel and of a second flow plate in the form of a second embossed sheet defining the cathode flow channel. These two sheets of the flow plates are assembled back to back by welding to form a bipolar plate. A flow channel for the cooling fluid is put into the space between the sheets.

The carbon-polymer composite technology makes possible greater flexibility in design of the flow channels by molding thicker plates.

The document FR 2 973 583 provides for the deletion of the cooling liquid channel in one bipolar plate out of two. With bipolar plates made of sheet metal, the bipolar plate devoid of a cooling liquid channel comprises just one embossed sheet, which lightens the fuel cell. The cathode flow channels are formed on a first face of the sheet, while the anode flow channels are formed on the other face of the sheet.

The design of these channels is then closely related, since the anode face is the negative of the cathode face. Nevertheless, the pattern of the channels has to guarantee that the flows in the bipolar plates having just one sheet are similar to those in the bipolar plates having two sheets, in order not to create an imbalance in supply between the different cells. Furthermore, it is desirable for one and the same sheet to be able to be used without distinction for a bipolar plate having a single sheet or to form a bipolar plate having two sheets.

An additional design constraint relates to the drops in pressure in the flows of reactants, these drops in pressure having to have one and the same order of magnitude at the anode and at the cathode. This constraint has an effect on the respective cross sections of the fuel and oxidant flow channels. This constraint complicates the design of a bipolar plate having just one sheet.

For molecular hydrogen used as fuel, the passage cross section in the anode channels has to be smaller than that in the cathode channels in order to obtain a drop in pressure of the same order of magnitude. This is because molecular hydrogen is less viscous than the oxidant circulating at the cathode and its flow rate is lower.

The molar flow rate of molecular hydrogen consumed in a cell is equal to $I/$, I being the electric current produced and F the Faraday constant. The molar flow rate of air consumed is, for its part, equal to $1.2*I/F$.

In practice, the flow rates of fuel and oxidant introduced into the cells are always greater than the flow rates consumed, according to an overvaluation or mark-up factor. For molecular hydrogen, the overvaluation factor is generally between 1 and 2.5. For air, the overvaluation factor is generally between 1.2 and 3, in order to guarantee a sufficient amount of oxygen at the outlet. Thus, for a given current I, the ratio of the molar flow rate of air to the molar flow rate of molecular hydrogen is at least equal to 2 and most commonly between 3 and 5.

The viscosity of humid molecular hydrogen is of the order of $8*10^{-6}$ to $13*10^{-6}$ Pa·s, depending on the temperature and the moisture content. The viscosity of humid air is of the order of $12*10^{-6}$ to $21*10^{-6}$ Pa·s.

When the flow channels of a bipolar plate are identical on the hydrogen and air sides, a ratio of the drop in pressure for the air to the drop in pressure for the molecular hydrogen of between 2 and 10 is obtained. In order to balance the drops in pressure, it is desirable to reduce the passage cross section of the molecular hydrogen flow channels with a ratio of between 2 and 10 with respect to the passage cross section of the air flow channels.

Several alternatives are known for reducing this disproportion in drops in pressure, with associated disadvantages:
- increasing the width of the cathode flow channels, producing anode channels having the thinnest width which it is industrially possible to produce. This contradicts research on the optimum effectiveness of electron conduction in the fuel cell, which is generally obtained by reducing as much as possible the width of the flow channels;
- producing fewer flow channels at the anode than at the cathode. The distance between two anode channels increases, as well as the width of the teeth separating the channels. This structure is unsuitable for a bipolar plate having just one sheet as the electron conduction from the cathodes is then greatly affected;
- decreasing the depth of the anode flow channels. This structure is unsuitable for a bipolar plate having just one sheet as the anode and cathode channels automatically have one and the same depth and are thus affected by this decrease in depth.

BRIEF SUMMARY

The invention is targeted at overcoming one or more of these disadvantages. The invention is targeted in particular at making possible the use of identical sheets for a bipolar plate having a single flow plate and for a bipolar plate having double flow plates, without anode and cathode flow disparities for these two types of bipolar plates, and while promoting uniformity in the drops in pressure between the anode channels and the cathode channels. The invention thus relates to a flow guiding plate for a fuel cell.

The invention additionally relates to a fuel cell.

BRIEF DESCRIPTION OF THE DRAWINGS

Other characteristics and advantages of the invention will clearly emerge from the description which is given thereof below, by way of indication and without any limitation, with reference to the appended drawings, in which:

FIG. 3 is a top view of the first face of the metal sheet of FIG. 2;

FIG. 4 is a view in cross section of the metal sheet of FIG. 2 at orifices for access to flow channels;

FIG. 5 is a view in cross section of the metal sheet of FIG. 2 in its median part;

FIG. 6 is a view in cross section of the metal sheet of FIG. 2 at a second end of the flow channels;

FIGS. 7 and 8 are views in perspective of the second face of the sheet of FIG. 2 at orifices for access to the flow channels;

FIG. 9 is a view in cross section of a fuel cell including different bipolar plates formed from metal sheets of FIG. 2;

DETAILED DESCRIPTION

Figure 1:
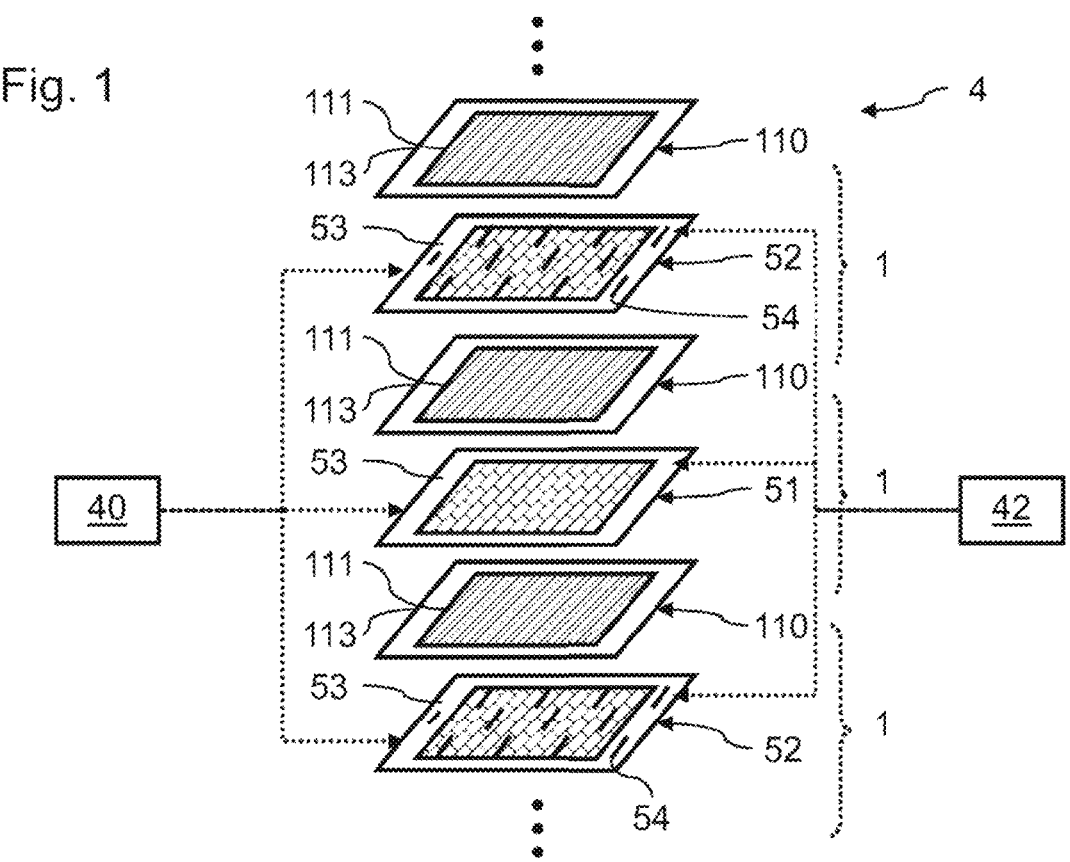
FIG. 1 is a view in exploded perspective of an example of a fuel cell.

FIG. 1 is a schematic view in exploded perspective of a stack of cells 1 of a fuel cell 4. The fuel cell 4 comprises several superposed cells 1. The cells 1 are of the type having a proton exchange membrane or polymer electrolyte membrane.

The fuel cell 4 comprises a source of fuel 40. The source of fuel 40 in this instance supplies an inlet of each cell 1 with molecular hydrogen. The fuel cell 4 also comprises a source of oxidant 42. The source of oxidant 42 in this instance supplies an inlet of each cell 1 with air, the oxygen of the air being used as oxidant. Each cell 1 also comprises escape channels. Each cell 1 also exhibits a cooling circuit.

Each cell 1 comprises a membrane electrode assembly 110 or MEA 110. A membrane electrode assembly 110 comprises an electrolyte 113, a cathode 112 (not illustrated in FIG. 1) and an anode 111 which are placed on either side of the electrolyte and attached to this electrolyte 113.

A bipolar plate is positioned between each pair of adjacent MEAs. The fuel cell 4 in this instance comprises an alternation of bipolar plates 51 and 52.

The bipolar plates 51 include a flow guiding plate 53 formed of a single metal sheet. In a bipolar plate 51, the relief of a first face of its metal sheet defines the anode flow channels, and the relief of a second face of its metal sheet defines the cathode flow channels.

The bipolar plates 52 include two flow guiding plates 53. Each of these flow guiding plates 53 includes one metal sheet. The sheets are superimposed and attached together via welds 54. In a bipolar plate 52, the relief of one face of a first flow guiding plate 53 defines the anode flow channels and the relief of one face of a flow guiding plate 53 defines the cathode flow channels. A cooling liquid flow channel is formed in between the metal sheets of the flow guiding plates 53 of a bipolar plate 52.

The metal sheets forming the flow guiding plates 53 of a bipolar plate 52 are identical. The metal sheets forming the flow guiding plates 53 of the bipolar plates 51 and 52 are identical. Thus, one and the same design and one and the same manufacturing process can be used for the manufacture of the metal sheets of the flow guiding plates 53 of the bipolar plates 51 and 52. The metal sheets are, for example, formed of stainless steel, of steel alloy, of titanium alloy, of aluminum alloy, of nickel alloy or of tantalum alloy.

In a way known per se, during the operation of the cell 1:
molecular hydrogen flows in an anode flow pipe between a bipolar plate and an anode 111;
air flows in a cathode flow pipe between a bipolar plate and a cathode 112.

At the anode 111, the molecular hydrogen is ionized to produce protons which pass through the MEA 110. The electrons produced by this reaction are collected by the bipolar plate positioned facing this anode 111. The electrons produced are subsequently applied to an electric charge connected to the fuel cell 4 in order to form an electric current. At the cathode 112, oxygen is reduced and reacts with the protons to form water. The reactions at the anode and the cathode are governed as follows:

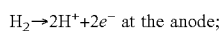

$H_2 \rightarrow 2H^+ + 2e^-$ at the anode;

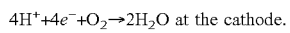

$4H^+ + 4e^- + O_2 \rightarrow 2H_2O$ at the cathode.

During its operation, a cell of the fuel cell normally generates a continuous voltage between its anode and its cathode of the order of 1 V. The catalyst material used in the anode 111 advantageously includes platinum, for its excellent catalytic performance.

Figure 2:
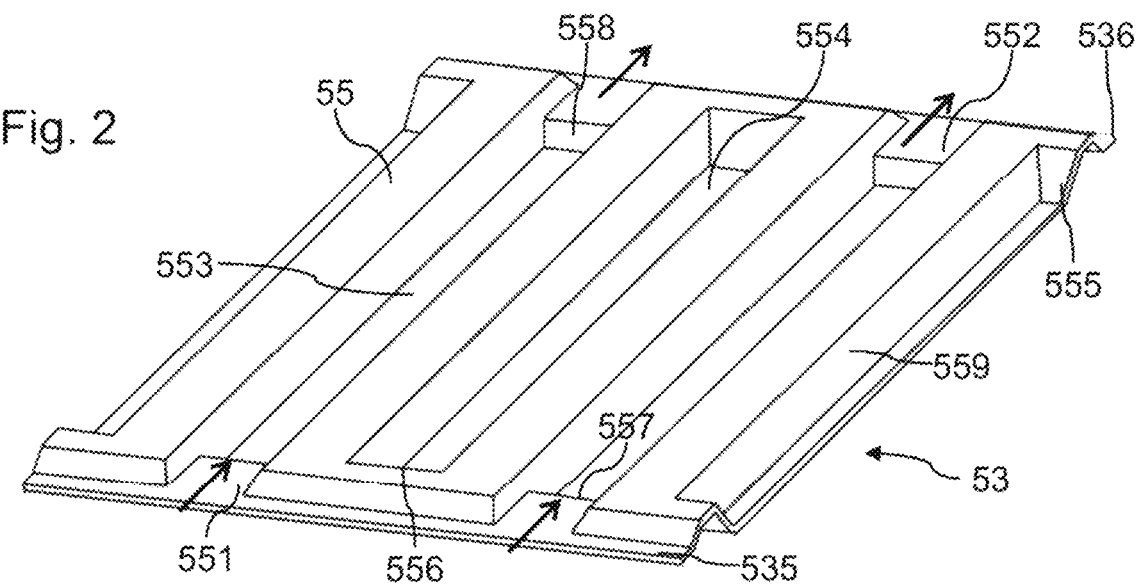
FIG. 2 is a view in perspective of flow channels on a first face of a first embodiment of a metal sheet for a fuel cell flow plate.
Figure 10:
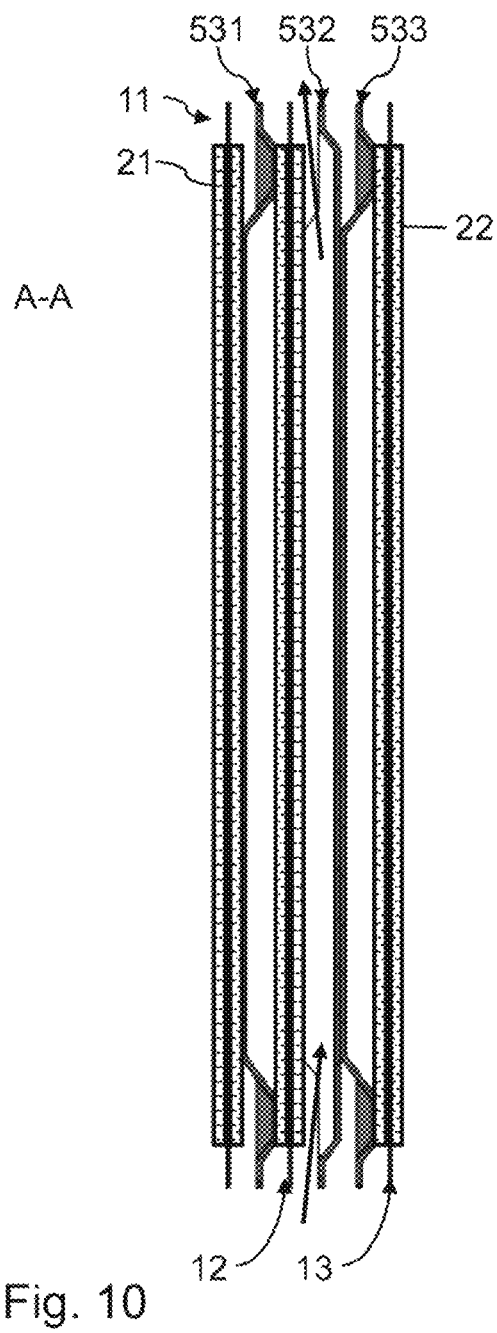
FIGS. 10 to 13 illustrate different views in longitudinal section of the fuel cell of FIG. 9.
Figure 11:
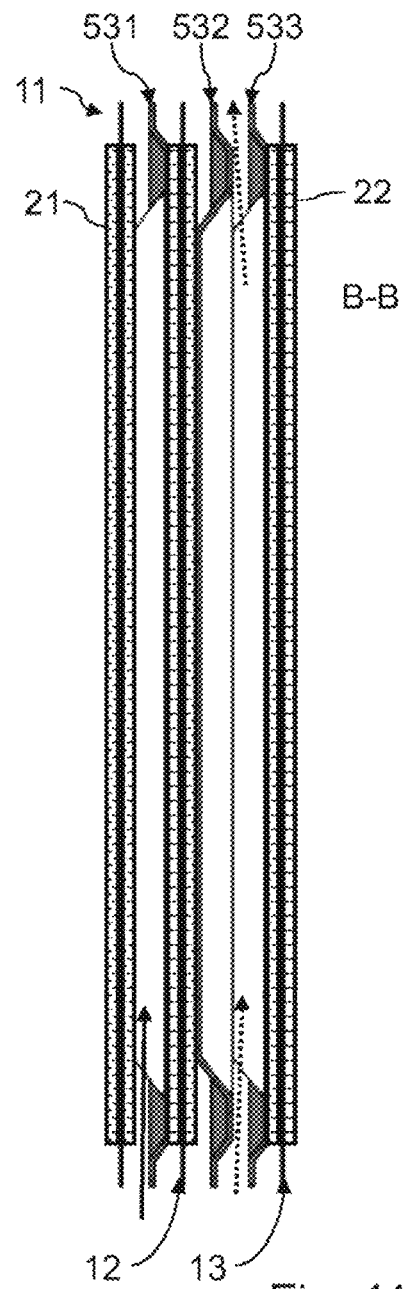
Figure 12:
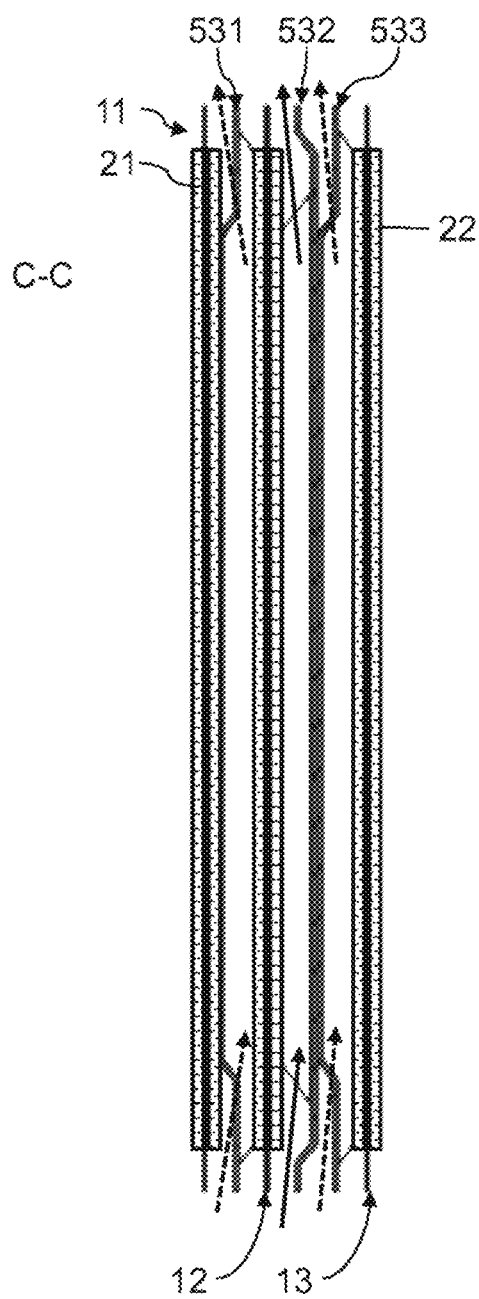
Figure 13:
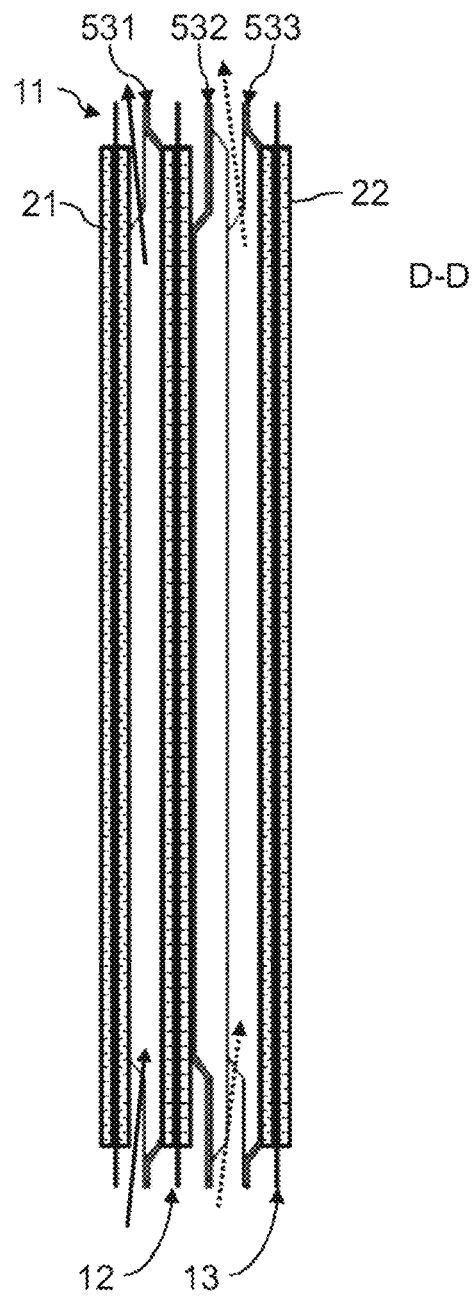

FIG. 2 is a view in perspective of flow channels on the anode side of a first embodiment of a conducting sheet of a flow guiding plate 53 according to the invention. FIG. 3 is a top view of the flow guiding plate 53. Such a flow guiding plate 53 can be used to form different types of bipolar plates, as described in detail subsequently.

The flow guiding plate 53 comprises a first face 55, illustrated in FIG. 2, and a second face 56. The relief of the flow guiding plate 53 defines an alternation of flow channels on the opposite faces 55 and 56. Thus, two successive flow channels of one and the same face of the flow guiding plate 53 are separated by walls 559 for delimitation of a flow channel of the other face. The flow channels of the faces 55 and 56 extend along one and the same longitudinal direction. In this example, the flow channels are substantially straight.

At the face 55, the flow channels are divided into first and second groups.

Access orifices 551 emerge in flow channels 553 of the first group. The access orifices 551 are positioned at a first end of the flow channels 553. A first flat part 535 forms a flow guiding surface extending between the different access orifices 551. A sloping wall 557 forms a junction between an access orifice 551 and the median part of its flow channel 553.

At the second end of the flow channels 553, access orifices 552 emerge in the flow channels 553 of the first group. A second flat part 536 forms a flow guiding surface extending between the different access orifices 552. A sloping wall 558 forms a junction between the access orifices 552 and the median part of their flow channel 553.

The cross section of each flow channel 553 in its median part, between its access orifices 551 and 552, is greater than the cross section at the access orifices 551 and 552. The sloping walls 557 and 558 thus extend downward as far as a flat bottom of the flow channel 553. The median part of the flow channels 553 is thus devoid of flow restrictions.

In order to guarantee uniform drops in pressure in the different flow channels 553, the latter exhibit one and the same cross section in their median part.

The face 55 exhibits flow channels 554 of the second group. The face 55 comprises an alternation of flow channels 553 and 554 along a transverse direction. In the embodiment illustrated in FIG. 2, the flow channels 554 comprise a wall 556 at their first end and a wall 555 at their second end. Each wall 555 extends from the bottom of a flow channel 554 as far as the top of the flat part 536. Each wall 556 extends from the bottom of a flow channel 554 as far as the top of the flat part 535. Thus, the cross section of the flow channels 554 at the walls 555 and 556 is smaller than the cross section of the orifices 551 and 552 for access to the flow channels of the first group. Each of these walls 555 and 556 thus forms a flow restriction of a flow channel 554. Each flow channel 554 thus comprises at least one flow restriction. The passage section of a flow restriction is defined as the cross section of the flow channel at this flow restriction. The walls 555 and 556 extend in this instance as far as the top of their flow channel 554 and as far as the bottom of the flow channels 563 of the face 56 which are described in detail subsequently.

The relief of the flow guiding plate 53 delimits flow channels 563 at the face 56. FIGS. 7 and 8 illustrate in perspective the first ends of two types of orifices 561 for access to the flow channels 563 via walls 567, 568, respectively. Each flow channel 563 is delimited with respect to the flow channels 553 and 554 of the face 55 via walls 559. The flow channels 553 and 554 comprise respective bottom walls 565 and 566 intended to form, for example, cathode conduction contacts at the face 56.

As illustrated in these figures, the alternation of the flow channels 553 and 554 on the face 55 results in two types of flow channels 563 on the face 56. The cross section of each flow channel 563 in its median part, between the access orifices at its longitudinal ends, is greater than the cross section at these access orifices. Sloping walls thus extend downward from an access orifice as far as a flat bottom of their flow channel 563. The median part of the flow channels 563 is thus devoid of flow restrictions.

It is thus found that, as a result of the alternation of the flow channels 553 and 554, the two types of flow channels 563 and of their access orifices are symmetrical to one another with respect to a longitudinal plane perpendicular with respect to the mean plane of the flow guiding plate 53. Consequently, the drops in pressure through the two types of flow channels 563 will be absolutely identical. In order to guarantee uniform drops in pressure in the different flow channels 563, the latter exhibit one and the same cross section in their median part.

In this embodiment, two successive flow channels 563 are in communication at each of their ends, as a result of the passages formed in order to build the walls 555 and 556 at the access orifices. Consequently, possible dispersions in drops in pressure between two successive channels 563 can be rendered uniform by bringing them into communication in such a way.

FIG. 4 is a view in cross section of the flow guiding plate 53 in the flat part 535. FIG. 5 is a view in cross section of the flow guiding plate 53 in the median part of the flow channels. FIG. 6 is a view in cross section of the flow guiding plate 53 at the access orifices 552.

The flat part 535 extends between the access orifices of the first end of the flow channels 563. The flat part 535 thus forms a distributor between the orifices for access to the flow channels 563 at this first end.

The flat part 536 extends between the access orifices of the second end of the flow channels 563. The flat part 536 thus forms a distributor between the orifices for access to the flow channels 563 at this second end.

The walls 559 provide separation between the flow channels of the two faces. The bottom of a channel 563 is thus positioned at the top of a channel 553 or 554, and vice versa. The bottoms of the different flow channels are intended to form conducting surfaces for collecting the electric current which has to pass through the flow guiding plates 53.

The orifices for access to the flow channels 563 exhibit one and the same section at the two ends of these flow channels. The access orifices 562 of the second end of the flow channels 563 are illustrated in FIG. 6. These access orifices 562 exhibit in this instance a height corresponding to half the height of the channels 563. The assembling of two flow guiding plates 53 in a stack of cells of a fuel cell 4 is thus facilitated.

The flow guiding plate 53 is in this instance formed of a metal sheet embossed in order to confer a relief on it. The shape of the face 55 is thus the complement or the negative of the shape of the face 56. The flow guiding plate 53 can, for example, be produced by embossing a metal sheet.

In this example, the flow channels 553 and 554 exhibit one and the same cross section over at least 75% of their median part. Thus, the bottom of the flow channels 554 provides a very large surface area for collecting, if appropriate, a cathode current.

In this example, the flow channels 553, 554 and 563 exhibit an identical cross section in their median part. Consequently, these channels may exhibit the minimum width corresponding to their technology of formation, in order to optimize the uniformity in distribution of the current through the bipolar plate to be formed. Furthermore, the use of identical cross sections for the flow channels of the two faces facilitates the assembling of two flow guiding plates 53 in order to form a bipolar plate.

In this example, the flat parts 535 and 536 are placed at one and the same height and the flow channels 553, 554 and 563 exhibit one and the same depth with respect to these flat parts 535 and 536.

In the example, the access orifices 551 are intended to communicate with an opening 40 made through the flat part 535. The orifices for access to the first end of the flow channels 563 are intended to communicate with an opening 43 made through the flat part 535. The openings 40 and 43 are intended to be isolated from one another via seals, in a way known per se. The access orifices 552 are intended to communicate with an opening 41 made through the flat part 536. The orifices 562 for access to the second end of the flow channels 563 are intended to communicate with an opening 42 made through the flat part 536. The openings 41 and 42 are intended to be isolated from one another via seals, in a way known per se.

FIG. 9 is a view in cross section of an example of a fuel cell 4 using flow guiding plates 53 as described in detail above.

The fuel cell 4 comprises membrane electrode assemblies 11, 12 and 13. Each membrane electrode assembly comprises in this instance a gas diffusion layer 21 placed in contact with an anode 111. The anode 111 is attached to a proton exchange membrane 113. A cathode 112 is attached to the proton exchange membrane 113. A gas diffusion layer 22 is placed in contact with the cathode 112.

The fuel cell 4 additionally comprises flow guiding plates 531, 532 and 533 as described in detail with reference to FIGS. 1 to 8. The flow guiding plate 531 forms in this instance, by itself alone, a bipolar plate 51 positioned between the membrane electrode assembly 11 and the membrane electrode assembly 12.

The bottom wall of the flow channels 563 is in this instance in contact with the gas diffusion layer 21 of the membrane electrode assembly 12. The bottom wall of the flow channels 553 and 554 is in this instance in contact with the gas diffusion layer 22 of the membrane electrode assembly 11.

The flow guiding plates 532 and 533 form in this instance a bipolar plate 52 positioned between the membrane electrode assembly 12 and the membrane electrode assembly 13. The bottom wall of the flow channels 563 of the plate 532 is in this instance placed in contact with the bottom wall 566 of the flow channels 554 of the plate 533. The plate 532 can be attached to the plate 533 via welds (not illustrated) promoting the electrical conduction between the plates 532 and 533.

Flow circuits 57 are thus formed between the plates 532 and 533 by the combination:
  of the flow channels 554 of the plate 532 with flow channels 563 of the plate 533;
  of the flow channels 553 of the plate 532 with flow channels 563 of the plate 533.

The bottom wall of the flow channels 554 of the plate 532 is in this instance in contact with the gas diffusion layer 22 of the membrane electrode assembly 12. The bottom wall of the flow channels 563 of the plate 533 is in this instance in contact with the gas diffusion layer 21 of the membrane electrode assembly 13.

It is found that the use of plates 531 to 533 exhibiting the same geometry makes it possible to form two different types of bipolar plates 51 and 52, while guaranteeing:
  identical respective fuel flow rates through these bipolar plates;
  identical respective oxidant flow rates through these bipolar plates.

The geometry of an object is normally defined by the shape of an object or by its morphological characteristics.

The flow channels 563 of the plate 531 are intended to be traversed by oxidant, for example air. The flow channels 553 of the plate 531 are intended to be traversed by fuel, for example molecular hydrogen. The flow channels 554 are not intended to be traversed by a flow (or else to be traversed marginally by flow through the diffusion layers) as a result of the presence of flow restrictions, this being the case despite there being one and the same cross section of the flow channels 553 and 554 over most of their median part. For identical flow conditions, the drop in pressure through the flow channels of the face 55 is greater than the drop in pressure through the flow channels of the face 56.

Thus, it is possible to render uniform the drops in pressure in the fuel and oxidant flows, this being the case despite differences in molar flow rates and differences in viscosity of the fluids in these flow channels. Furthermore, the presence of the walls 555 and 556 does not detrimentally affect the uniformity in the distribution of the fluids at the face 56.

The flow channels 563 of the plate 532 are intended to be traversed by oxidant. The flow channels 553 of the plate 533 are intended to be traversed by fuel. As in the preceding case, the flow channels 554 of the plate 533 are not intended to be traversed by fuel, as a result of the presence of flow restrictions.

The drops in pressure for the fuel are thus identical for both types of bipolar plates 51 and 52. The drops in pressure for the oxidant are also identical for both types of bipolar plates.

In the oxidant flow channels, the gas flow is carried out between an inlet and an outlet of one and the same flow channel 563. The flow is thus in this instance of the parallel type.

In the fuel flow channels, the gas flow is carried out between an inlet and an outlet of one and the same flow channel 553. The flow is thus in this instance of the parallel type.

The bipolar plate formed of the plates 532 and 533 comprises a flow circuit 57 intended to be traversed by cooling liquid. In order to lighten the bipolar plate formed from the plate 531, this is devoid of a cooling liquid flow circuit.

FIGS. 10 to 13 are views in longitudinal section which make it possible to illustrate different flows of fluids through the bipolar plates 51 and 52. The flows in a dotted line correspond to flows of cooling liquid. The flows in a broken line correspond to fuel flows. The flows in a solid line correspond to oxidant flows.

In order to make possible the formation of bipolar plates 51 having a single flow guiding plate 53 and of bipolar plates 52 having double flow guiding plates 53, in order to be able to use one and the same geometry of flow guiding plates 53, the latter advantageously exhibit an axis of symmetry. The axis of symmetry is typically perpendicular to a median plane of the plate.

Figure 14:
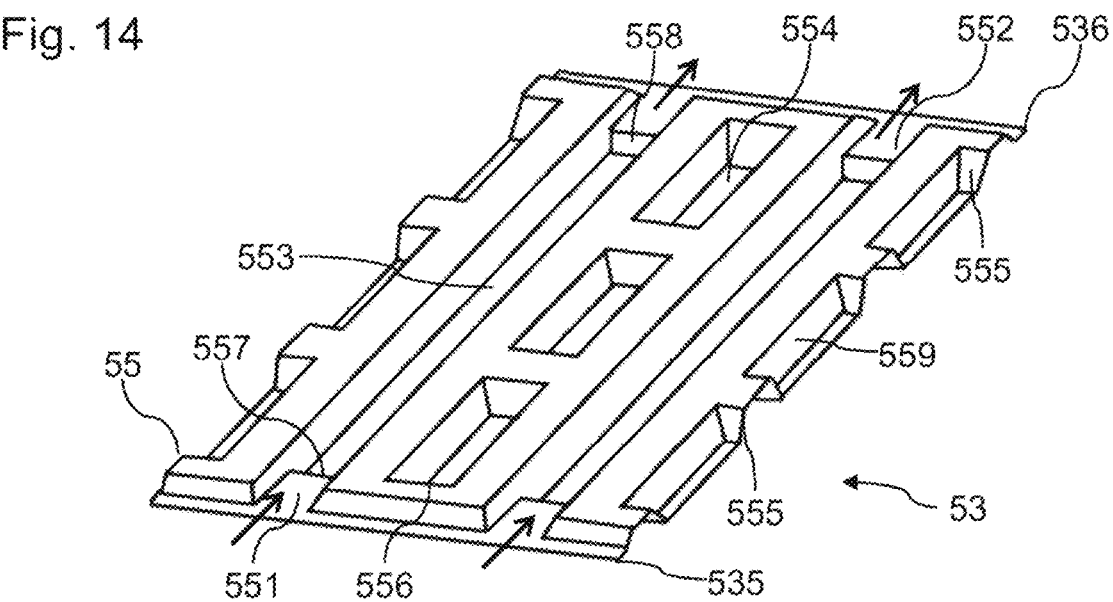
FIGS. 14 and 15 are views in perspective of the first face of second and third embodiments of metal sheets.

FIG. 14 is a view in perspective of flow channels on the anode side of a second embodiment of a conducting sheet of a flow guiding plate 53 according to the invention. This second embodiment differs from the first embodiment in the presence of additional flow restrictions in the flow channels 554. Additional walls 555 are thus built in order to seal the median part of the flow channels 554.

In this embodiment, two successive flow channels 563 are thus in communication at their median parts, as a result of the passages formed in order to put in the walls 555 and 556. Consequently, possible dispersions in drops in pressure between two successive channels 563 can be rendered more uniform by bringing them into communication in such a way.

Figure 15:
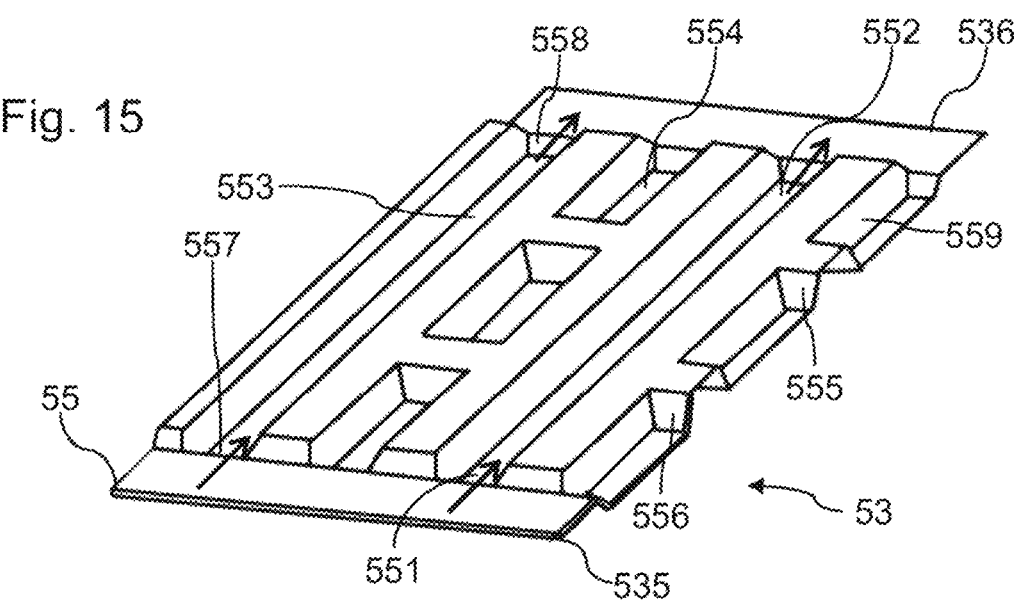

FIG. 15 is a view in perspective of flow channels on the anode side of a third embodiment of a conducting sheet of a flow guiding plate 53 according to the invention. This third embodiment differs from the second embodiment in the absence of flow restrictions at the ends of the flow channels 554. Flow restrictions are in this instance inserted in the median part of the flow channels 554. Additional walls 555 are thus built in order to seal the median part of the flow channels 554.

In this embodiment, two successive flow channels 563 are thus in communication at their median parts, as a result of the passages formed in order to build the walls 555 and 556. Consequently, possible dispersions in drops in pressure between two successive channels 563 are again rendered uniform by bringing them into communication in such a way.

Figure 16:
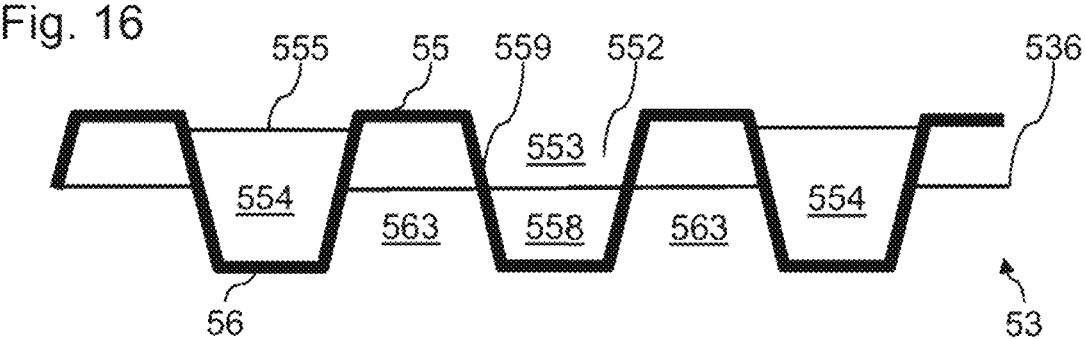
FIG. 16 is a view in cross section of an alternative form of the first embodiment of a metal sheet at orifices for access to the flow channels.

FIG. 16 is a view in section of an alternative form of flow guiding plate 53 at a first end of the flow channels. The flow guiding plate 53 differs from that of the alternative form of FIGS. 1 to 8 in the geometry of the walls 555 and 556. The walls 555 and 556 do not extend as far as the top of their flow channel 554 (or do not extend as far as the bottom of the interposed flow channels 563). Consequently, a flow can pass through a flow channel 554 by surmounting the walls 555 and 556, but with drops in pressure which are much greater than the drops in pressure through a flow channel 553. Advantageously, the walls 555 and 556 extend at least as far as three quarters of the depth of the flow channels 563 of the face 56.

In the examples illustrated, the flow channels exhibit a straight shape along the longitudinal direction. It is possible, of course, to provide other flow channel geometries, for example flow channels having undulations along their longitudinal direction.

The invention claimed is:

1. A flow guiding plate for a fuel cell, comprising:
a conducting sheet including a first flat part, a second flat part, and flow channels extending between the first flat part and the second flat part, the flow channels including flow channels on a first face of the conducting sheet and flow channels on a second face of the conducting sheet, the second face being opposite to the first face,
wherein the flow channels on the first face alternate with, and are parallel to, the flow channels on the second face such that two successive flow channels on the first face are separated by walls delimiting a flow channel on the second face,
wherein the flow channels on the first face include a first group of flow channels and a second group of flow channels, the first group of flow channels and the second group of flow channels on the first face being recessed below the first flat part and the second flat part,
wherein each flow channel of the first group of flow channels on the first face and the flow channels on the second face include a first access orifice at the first flat part and a second access orifice at the second flat part, and a cross section of each of the flow channels between the first access orifice and the second access orifice is greater than a cross section at the first access orifice and at the second access orifice,
wherein each flow channel of the second group of flow channels on the first face includes a flow restriction at the first flat part and at the second flat part such that a pressure drop across each flow channel of the second group is greater than a pressure drop across each flow channel of the first group, a cross section at each of the flow restrictions of the flow channels of the second group being smaller than the cross section at the first access orifice and at the second access orifice of the flow channels of the first group, and
wherein the first face comprises an alternation of flow channels of the first group and of flow channels of the second group.

2. The flow guiding plate as claimed in claim 1, wherein each flow channel of the second group of flow channels includes a first wall at a first end of the flow channel and a second wall at a second end of the flow channel, each of the first and second walls extending from a bottom of a deepest portion of the flow channel to a top of the deepest portion of the flow channel to form the flow restriction.

3. The flow guiding plate as claimed in claim 2, wherein the walls that separate each of the successive flow channels of the first face extend to a same height as the first and second walls of the second group of flow channels.

4. The flow guiding plate as claimed in claim 2, wherein each flow channel of the second group of flow channels includes a third wall at the first end of the flow channel and a fourth wall at the second end of the flow channel, the third wall extending upward from the first flat part and the fourth wall extending upward from the second flat part.

5. The flow guiding plate as claimed in claim 1, further comprising:
walls extending upward from the first flat part and the second flat part to form access orifices for the second group of flow channels.

6. The flow guiding plate as claimed in claim 1, wherein each flow channel of the first group of flow channels includes a first wall at a first end of the flow channel and a second wall at a second end of the flow channel, the first wall extending down from the first flat part to a bottom of a deepest portion of the flow channel to form the first access orifice, and the second wall extending down from the second flat part to the bottom of the deepest portion of the flow channel to form the second access orifice.

7. The flow guiding plate as claimed in claim 1, wherein each flow channel of the second group of flow channels includes a first wall at a first end of the flow channel and a second wall at a second end of the flow channel, each of the first and second walls extending from a bottom of a deepest portion of the flow channel to a top of the deepest portion of the flow channel to form the flow restriction,
wherein each flow channel of the first group of flow channels includes a first wall at a first end of the flow channel and a second wall at a second end of the flow channel, the first wall extending down from the first flat part to a bottom of a deepest portion of the flow channel to form the first access orifice, and the second wall extending down from the second flat part to the bottom of the deepest portion of the flow channel to form the second access orifice, and
wherein each of the first and second walls of the second group of flow channels extends higher than each of the first and second walls of the first group of flow channels.

8. The flow guiding plate as claimed in claim 1, wherein each of the flow restrictions extends at least as far as three quarters of a depth of the flow channels of the second face.

9. The flow guiding plate as claimed in claim 1, wherein each of the flow restrictions includes a wall extending as far as a bottom of the flow channels of the second face.

10. The flow guiding plate as claimed in claim 1, wherein the flow channels of the first group and of the second group exhibit a same cross section in their median part.

11. The flow guiding plate as claimed in claim 1, wherein the flow channels of the first group exhibit a same depth below the first flat part and the second flat part as the flow channels of the second group over at least three quarters of their length.

12. The flow guiding plate as claimed in claim 1, wherein the flow restriction of each flow channel of the second group delimits a passage between two flow channels of the second face.

13. The flow guiding plate as claimed in claim 1, wherein a shape of the first face of the sheet is a complement of a shape of the second face of the sheet.

14. The flow guiding plate as claimed in claim 1, wherein the sheet is a sheet of steel alloy, of titanium alloy, of aluminum alloy, of nickel alloy, or of tantalum alloy.

15. The flow guiding plate as claimed in claim 1, wherein the flow channels of the first and second faces have a same depth with respect to the first and second flat parts.

16. The flow guiding plate as claimed in claim 1, wherein the sheet exhibits an axis of symmetry.

17. A fuel cell comprising:
first, second, and third guiding plates as claimed in claim 1;
first, second, and third membrane electrode assemblies each comprising a proton exchange membrane, a cathode, and an anode which are attached on either side of the proton exchange membrane;
first and second gas diffusion layers;
the first guiding plate forming a bipolar plate interposed between the first and second membrane electrode assemblies, the first gas diffusion layer covering the flow channels of the first face of the first guiding plate and being in contact with the first face and with the anode of the second membrane electrode assembly;
the second and third guiding plates delimiting, between them, a flow circuit and forming a bipolar plate interposed between the second and third membrane electrode assemblies, the first face of the second guiding plate being in contact with the second face of the third guiding plate, the second gas diffusion layer covering the flow channels of the first face and being in contact with this first face of the third guiding plate and with the anode of the third membrane electrode assembly.

18. The fuel cell as claimed in claim 17, wherein the first, second, and third guiding plates are guiding plates in which the flow restrictions of the first guiding plate are in contact with the first gas diffusion layer and the flow restrictions of the third guiding plate are in contact with the second gas diffusion layer.

19. The fuel cell as claimed in claim 17, wherein the first, second, and third guiding plates are traversed by openings communicating with the flow circuit.

20. The fuel cell as claimed in claim 17, wherein the first, second, and third guiding plates exhibit identical geometries.

* * * * *